(12) United States Patent
Baudisch et al.

(10) Patent No.: US 7,721,197 B2
(45) Date of Patent: *May 18, 2010

(54) SYSTEM AND METHOD OF DISPLAYING CONTENT ON SMALL SCREEN COMPUTING DEVICES

(75) Inventors: Patrick Markus Baudisch, Seattle, WA (US); Xing Xie, Beijing (CN); Chong Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 10/917,555

(22) Filed: Aug. 12, 2004

(65) Prior Publication Data

US 2006/0036955 A1 Feb. 16, 2006

(51) Int. Cl.
G06F 17/21 (2006.01)

(52) U.S. Cl. ............ 715/238; 715/204; 715/233; 715/237; 715/239; 715/765; 715/808; 715/810; 715/856

(58) Field of Classification Search ........... 715/765, 715/204, 233, 237–239, 808, 810
See application file for complete search history.

(56) References Cited

U.S. PATENT DOCUMENTS

| | | | | |
|---|---|---|---|---|
| 5,060,170 A * | 10/1991 | Bourgeois et al. | ........... | 715/788 |
| 5,500,935 A * | 3/1996 | Moran et al. | ........... | 715/863 |
| 5,564,112 A * | 10/1996 | Hayes et al. | ........... | 715/863 |
| 5,704,050 A * | 12/1997 | Redpath | ........... | 715/764 |
| 5,712,995 A * | 1/1998 | Cohn | ........... | 715/792 |
| 5,721,853 A * | 2/1998 | Smith | ........... | 715/803 |
| 5,771,042 A * | 6/1998 | Santos-Gomez | ........... | 715/800 |
| 5,796,402 A * | 8/1998 | Ellison-Taylor | ........... | 715/792 |
| 5,798,752 A * | 8/1998 | Buxton et al. | ........... | 715/863 |
| 5,805,167 A * | 9/1998 | van Cruyningen | ........... | 715/808 |
| 5,819,055 A * | 10/1998 | MacLean et al. | ........... | 715/798 |
| 5,838,318 A * | 11/1998 | Porter et al. | ........... | 715/790 |
| 5,842,218 A * | 11/1998 | Robinson | ........... | 707/102 |
| 5,847,706 A * | 12/1998 | Kingsley | ........... | 715/788 |
| 5,920,315 A * | 7/1999 | Santos-Gomez | ........... | 715/792 |
| 5,949,418 A * | 9/1999 | Shields et al. | ........... | 715/795 |
| 6,008,809 A * | 12/1999 | Brooks | ........... | 715/792 |
| 6,037,937 A * | 3/2000 | Beaton et al. | ........... | 715/764 |
| 6,097,387 A * | 8/2000 | Sciammarella et al. | ........... | 715/784 |
| 6,141,007 A * | 10/2000 | Lebling et al. | ........... | 715/792 |
| 6,154,205 A * | 11/2000 | Carroll et al. | ........... | 345/684 |
| 6,166,736 A * | 12/2000 | Hugh | ........... | 715/798 |
| 6,185,589 B1 * | 2/2001 | Votipka | ........... | 715/517 |
| 6,195,094 B1 * | 2/2001 | Celebiler | ........... | 715/764 |

(Continued)

OTHER PUBLICATIONS

Schneiderman, ben et al. "Elastic Windows: Evaluation of Multi-Window Operations" Mar. 1997.*

(Continued)

*Primary Examiner*—Steven B Theriault
(74) *Attorney, Agent, or Firm*—Lee & Hayes, PLLC

(57) ABSTRACT

Embodiments of the present invention provide a system, method, and computer-readable medium for viewing Web pages on small form factor computing devices. More specifically, the present invention layers Web browsing in a system where a Web page is first displayed in an overview mode at a predetermined magnification. From a Web page displayed in overview mode, the user may issue adaptive viewing commands that cause relevant content to be displayed using additional screen space.

19 Claims, 12 Drawing Sheets

U.S. PATENT DOCUMENTS

| | | | |
|---|---|---|---|
| 6,246,411 B1* | 6/2001 | Strauss | 715/863 |
| 6,248,946 B1* | 6/2001 | Dwek | 84/609 |
| 6,275,829 B1* | 8/2001 | Angiulo et al. | 707/104.1 |
| 6,300,947 B1* | 10/2001 | Kanevsky | 715/866 |
| 6,310,631 B1* | 10/2001 | Cecco et al. | 715/792 |
| 6,313,853 B1* | 11/2001 | Lamontagne et al. | 715/762 |
| 6,380,940 B1* | 4/2002 | Halstead et al. | 345/469.1 |
| 6,414,698 B1* | 7/2002 | Lovell et al. | 715/800 |
| 6,459,442 B1* | 10/2002 | Edwards et al. | 715/863 |
| 6,462,759 B1* | 10/2002 | Kurtzberg et al. | 715/803 |
| 6,603,493 B1* | 8/2003 | Lovell et al. | 715/800 |
| 6,639,611 B1* | 10/2003 | Leduc | 715/764 |
| 6,647,534 B1* | 11/2003 | Graham | 715/526 |
| 6,661,436 B2* | 12/2003 | Barksdale et al. | 715/788 |
| 6,671,853 B1* | 12/2003 | Burkett et al. | 715/235 |
| 6,675,351 B1* | 1/2004 | Leduc | 715/503 |
| 6,684,087 B1* | 1/2004 | Yu et al. | 455/566 |
| 6,704,024 B2* | 3/2004 | Robotham et al. | 345/581 |
| 6,731,316 B2* | 5/2004 | Herigstad et al. | 715/864 |
| 6,825,860 B1* | 11/2004 | Hu et al. | 715/801 |
| 6,865,719 B1* | 3/2005 | Nicholas, III | 715/856 |
| 6,882,755 B2* | 4/2005 | Silverstein et al. | 382/282 |
| 6,919,890 B2* | 7/2005 | Halstead, Jr. | 345/440 |
| 6,928,436 B2* | 8/2005 | Baudel | 707/6 |
| 6,938,221 B2* | 8/2005 | Nguyen | 715/863 |
| 6,993,726 B2* | 1/2006 | Rosenholtz et al. | 715/835 |
| 7,027,052 B1* | 4/2006 | Thorn et al. | 345/440 |
| 7,051,276 B1* | 5/2006 | Mogilevsky et al. | 715/209 |
| 7,055,110 B2* | 5/2006 | Kupka | 715/863 |
| 7,065,707 B2* | 6/2006 | Chen et al. | 715/234 |
| 7,076,742 B1* | 7/2006 | Thorn et al. | 715/853 |
| 7,143,347 B2* | 11/2006 | Su | 715/208 |
| 7,165,228 B2* | 1/2007 | Taylor et al. | 715/788 |
| 7,203,901 B2* | 4/2007 | Chen et al. | 715/205 |
| 7,210,107 B2* | 4/2007 | Wecker et al. | 715/863 |
| 7,222,306 B2* | 5/2007 | Kaasila et al. | 715/801 |
| 7,228,492 B1* | 6/2007 | Graham | 715/500 |
| 7,246,306 B2* | 7/2007 | Chen et al. | 715/205 |
| 7,310,779 B2* | 12/2007 | Carro | 715/763 |
| 7,325,198 B2* | 1/2008 | Adcock et al. | 715/722 |
| 2002/0033837 A1* | 3/2002 | Munro | 345/654 |
| 2002/0089549 A1* | 7/2002 | Munro et al. | 345/835 |
| 2002/0133627 A1* | 9/2002 | Maes et al. | 709/246 |
| 2002/0143826 A1* | 10/2002 | Day et al. | 707/526 |
| 2002/0149605 A1* | 10/2002 | Grossman | 345/660 |
| 2002/0154168 A1* | 10/2002 | Ijas et al. | 345/764 |
| 2002/0186262 A1* | 12/2002 | Itavaara et al. | 345/864 |
| 2002/0191028 A1* | 12/2002 | Senechalle et al. | 345/800 |
| 2002/0196287 A1* | 12/2002 | Taylor et al. | 345/792 |
| 2003/0179189 A1* | 9/2003 | Lira | 345/173 |
| 2003/0179239 A1* | 9/2003 | Lira | 345/776 |
| 2003/0182628 A1* | 9/2003 | Lira | 715/517 |
| 2003/0229900 A1* | 12/2003 | Reisman | 725/87 |
| 2004/0008224 A1* | 1/2004 | Molander et al. | 345/764 |
| 2004/0054968 A1* | 3/2004 | Savage | 715/513 |
| 2004/0100509 A1* | 5/2004 | Sommerer et al. | 345/864 |
| 2004/0103371 A1 | 5/2004 | Chen et al. | |
| 2004/0133848 A1* | 7/2004 | Hunt et al. | 715/500 |
| 2004/0135824 A1* | 7/2004 | Fitzmaurice | 345/856 |
| 2004/0160462 A1* | 8/2004 | Sheasby et al. | 345/788 |
| 2004/0168115 A1* | 8/2004 | Bauernschmidt et al. | 715/500 |
| 2004/0205536 A1* | 10/2004 | Newman et al. | 715/509 |
| 2005/0022116 A1* | 1/2005 | Bowman et al. | 715/513 |
| 2005/0081241 A1* | 4/2005 | Chen | 725/41 |
| 2005/0097444 A1* | 5/2005 | Ivarsey et al. | 715/501.1 |
| 2005/0149879 A1* | 7/2005 | Jobs et al. | 715/796 |
| 2005/0166158 A1* | 7/2005 | Blanchard et al. | 715/768 |
| 2005/0195221 A1* | 9/2005 | Berger et al. | 345/660 |
| 2005/0210399 A1* | 9/2005 | Filner et al. | 715/767 |
| 2006/0020903 A1* | 1/2006 | Wang et al. | 715/792 |
| 2006/0085767 A1* | 4/2006 | Hinckley et al. | 715/863 |
| 2006/0156228 A1* | 7/2006 | Gallo et al. | 715/523 |
| 2006/0195782 A1* | 8/2006 | Wang et al. | 715/509 |
| 2006/0242557 A1* | 10/2006 | Nortis III | 715/509 |
| 2006/0256130 A1* | 11/2006 | Gonzalez | 345/619 |
| 2006/0265669 A1* | 11/2006 | Lee | 715/818 |
| 2006/0268100 A1* | 11/2006 | Karukka et al. | 348/14.01 |
| 2007/0038643 A1* | 2/2007 | Epstein | 707/10 |
| 2007/0050708 A1* | 3/2007 | Gupta et al. | 715/513 |
| 2007/0198917 A1* | 8/2007 | Rohrabaugh et al. | 715/513 |
| 2007/0206221 A1* | 9/2007 | Wyler et al. | 358/1.15 |
| 2007/0288841 A1* | 12/2007 | Rohrabaugh et al. | 715/513 |
| 2007/0288855 A1* | 12/2007 | Rohrabaugh et al. | 715/760 |
| 2008/0028335 A1* | 1/2008 | Rohrabaugh et al. | 715/800 |
| 2008/0144107 A1* | 6/2008 | Lieb | 358/1.18 |

OTHER PUBLICATIONS

Bederson, B.B., et al., "Pad++: A Zoomable Graphical Sketchpad for Exploring Alternate Interface Physics," *Proceedings of the 7th Annual ACM Symposium on User Interface Software and Technology,* ACM Press, Marina del Ray, California, 1994, pp. 17-26.

Bickmore, T.W., and B.N. Schilit, "Digestor: Device-Independent Access to the World Wide Web," *Computer Networks and ISDN System* 29(8-13):1075-1082, Sep. 1997.

Björk, S., et al., "WEST: A Web Browser for Small Terminals," *Proceedings of the 12th Annual ACM Symposium on User Interface Software and Technology,* ACM Press, Asheville, North Carolina, 1999, pp. 187-196.

Buyukkokten, O., et al., "Accordion Summarization for End-Game Browsing on PDAs and Cellular Phones," *Proceedings of the SIGCHI Conference on Human Factors in Computing Systems,* ACM Press, Seattle, Washington, Mar. 2001, pp. 213-220.

Buyukkokten, O., et al., "Power Browser: Efficient Web Browsing for PDAs," *Proceedings of the SIGCHI Conference on Human Factors in Computing Systems,* ACM Press, The Hague, The Netherlands, Apr. 1-6, 2000, pp. 430-437.

Buyukkokten, O., et al., "Text Summarization of Web pages on Handheld Devices," *Proceedings of the 10th International Conference on World Wide Web,* Association for Computing Machinery (ACM), ACM Press, Hong Kong, May 1-5, 2001, pp. 652-662.

Gessler, S., and A. Kotulla, "PDAs as Mobile WWW Browsers," *Computer Networks and ISDN Systems* 28(1-2):53-59, Dec. 1995.

Gupta, S., et al., "DOM-based Content Extraction of HTML Documents," *Proceedings of the 12th International Conference on World Wide Web,* ACM Press, Budapest, Hungary, May 20-24, 2003, pp. 207-214.

Rahman, A.F.R., et al., "Content Extraction from HTML Documents," *Proceedings of the First International Workshop on Web Document Analysis,* Seattle, Washington, Sep. 8, 2001, pp. 7-10.

Wobbrock, J.O., et al., "WebThumb: Interaction Techniques for Small-Screen Browsers," *Proceedings of the 15th Annual ACM Symposium on User Interface Software and Technology,* ACM Press, Paris, France, Oct. 27-30, 2002, pp. 205-208.

* cited by examiner

SYSTEM AND METHOD OF DISPLAYING CONTENT ON SMALL SCREEN COMPUTING DEVICES

FIELD OF THE INVENTION

The present invention relates to computer programs and, in particular, to a Web browser that executes on small screen computing devices.

BACKGROUND OF THE INVENTION

Explosive growth in computer networks in the last two decades has changed the uses of computers dramatically. The largest computer network, commonly known as the Internet or World Wide Web ("WWW"), is now connecting millions of computers in the world, providing services like e-mail, file transfer, and hypermedia information retrieval across different computer platforms. Also, small mobile computing devices, such as personal desktop assistants including handheld and palm-type computers and the like, are becoming more popular for use by business people and others who must travel, and thus cannot readily access information stored on their desktop computer or office network workstation. Although laptop computers are capable of running virtually all of the application programs that execute on desktop machines, laptop computers are often either too large and/or too heavy to carry around.

Increasingly, users of small mobile computing devices are able to connect to computer networks such as the Internet. However, applications designed for desktop computers are not always well suited for smaller computing devices. For example, a Web browser is an application designed to download, upload, display, or otherwise access resources available from computer networks. Some Web browsers are text-based—meaning that they do not display graphics or images. However, most popular Web browsers provide a graphical interface that allows users to click buttons, icons, and menu options to view and navigate Web pages. Graphically-based Web browsers designed for desktop and laptop computing devices are not made for small-screen computing devices because, among other reasons, they display content at a magnification that is too large for small screens.

Web browsers designed for small mobile computing devices are currently available. However, Web pages are often designed with desktop screen resolutions in mind. For example, Web pages are typically formatted for a predetermined page width and/or include a multicolumn layout. On a small-screen computing device with an existing Web browser, these types of pages require users to scroll excessively in order to view content. To reduce the need for scrolling and provide a context for viewing, a "zoomed-out" version of a Web page with reduced magnification may be provided. However, Web pages displayed at a reduced magnification may be small and difficult to view.

In light of the above-identified problems, it would be beneficial to have a system that allows users of small, mobile computing devices to easily view Web pages designed with desktop screen resolutions in mind. The present invention is directed to providing such a system.

SUMMARY OF THE INVENTION

The present invention is generally directed to improving the graphical user interface of Web browsers that execute on small mobile computing devices. More specifically, the present invention allows users of computing devices with small displays (hereinafter referred to as computing devices with a small or limited "form factor") to easily view Web pages designed for larger computing devices. Displaying content on computing devices with a small form factor has been problematic because Web pages are typically formatted for a predetermined page layout that may be larger than the form factor of the computing device where the Web page will be displayed. When this occurs, users may need to repetitively scroll to view content on a Web page. The present invention provides a system where Web pages are first displayed in an overview mode that allows users to view content at a predetermined magnification. When a Web page is displayed in overview mode, the user may issue commands designed to identify relevant content and provide an improved view of this content by issuing commands designed to identity irrelevant content.

One aspect of the present invention is a method that receives a request, such as a HyperText Transfer Protocol ("HTTP") request, and displays a Web page in response to the request. The method divides the Web page into a set of cells and displays the Web page at a predetermined magnification that may be set at a value that does not require the user to scroll in one or both directions. When the Web page is displayed, a user may issue commands to display a subset of cells on the Web page. In response to receiving a user-generated command to display a subset of cells, the method identifies cells from the Web page that will be displayed and displays the subset of cells using additional screen space that was previously allotted to cells that will not be displayed.

Another aspect of the present invention is a method that divides content on a Web page into a set of cells. To classify Web content into the different cells, a Document Object Model ("DOM") tree is generated from the requested Web page. As known to those skilled in the art and others, the DOM defines methods for accessing and manipulating documents and facilitates and allows for navigation of hypertext documents. The method traverses nodes on the DOM tree categorizing content into different cells by projecting the location of content and identifying separators that divide the content. Once the content is classified into the different cells, a Web page is rendered that allows users to select one or more cells for viewing using additional screen space.

Yet another aspect of the present invention is a system that includes a computing device, an operating system, a Web browser, a content display module, and a graphical user interface. The system is configured to receive input from a user who identifies a Web page to display on the computing device. Then the system adds code to the Web page that allows one or more cells to be selected and viewed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide a system, method, and computer-readable medium for viewing Web pages on small form factor computing devices. More specifically, the present invention layers Web browsing in a system where a Web page is first displayed in an overview mode at a predetermined magnification. When a Web page is displayed in overview mode, the user may issue commands designed to identify relevant content and display this content using additional screen space.

Although the present invention will primarily be described in the context of processing HTML documents, those skilled in the relevant art and others will appreciate that the present invention is also applicable to other hypertext languages as well as other types of documents, such as maps, blueprints, images, spreadsheets, etc. Also, the present invention will primarily be described in the context of small form factor computing devices. However, aspects of the present invention are also applicable in other contexts of which the following are only examples. For instance, increasingly, Web page designers are placing advertisements on Web pages that are distracting to users. Commands supported by the present invention may be used on any computing device to identify irrelevant content and have relevant content displayed using additional screen space. As another example, a user who is visually impaired may issue commands supported by the present invention to have relevant content displayed in greater detail.

The following description first provides an overview of a system in which the present invention may be implemented. Then a method that layers Web browsing so that users may identify and view relevant content using additional screen space is described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
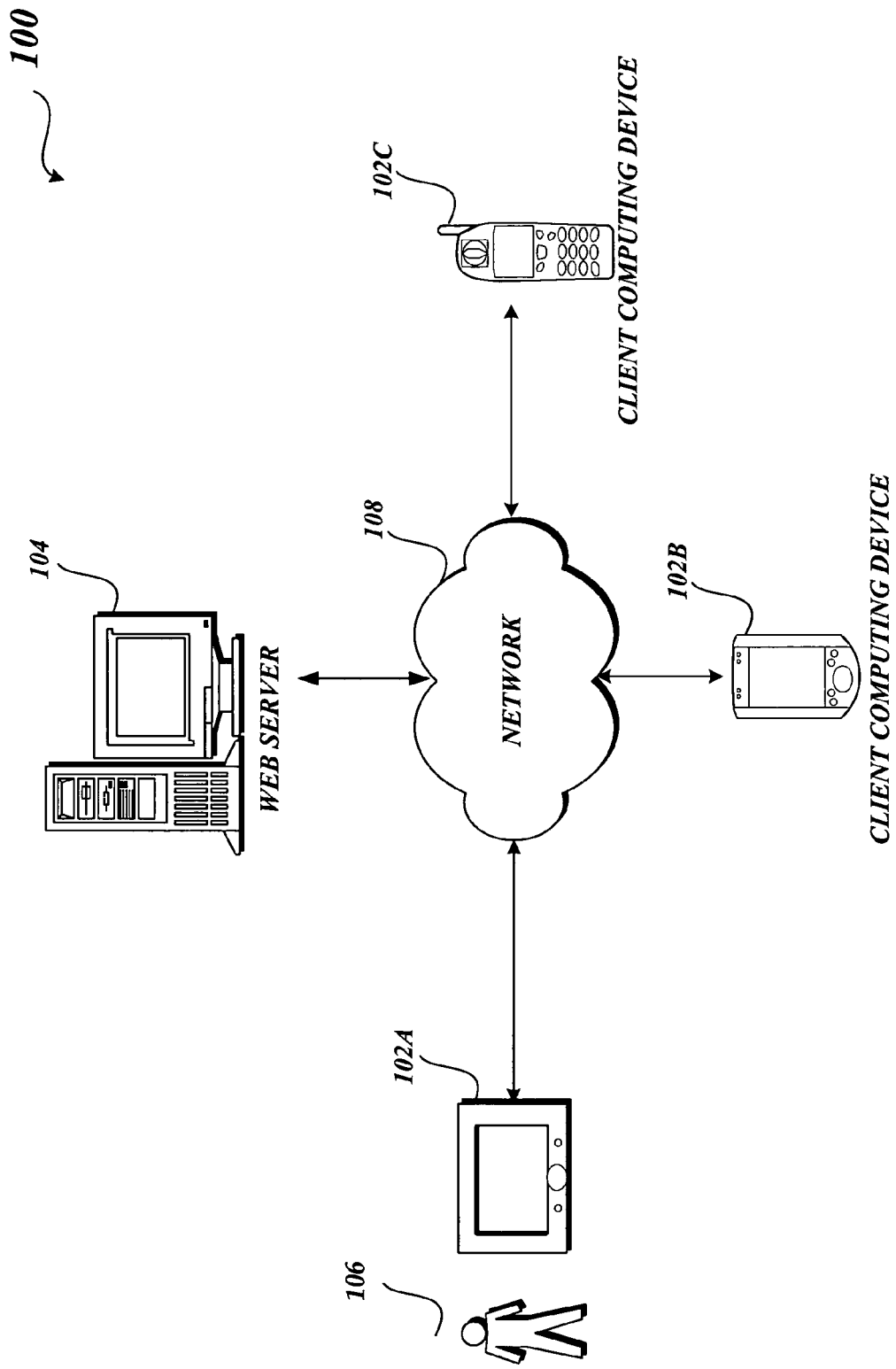
FIG. 1 is a pictorial diagram of a number of computing devices connected to a network, including a number of client computing devices and a server that allow communication via client-server software applications.

Referring to FIG. 1, the following is intended to provide an exemplary overview of one suitable computer system 100 in which the invention may be implemented. The illustrated computer system 100 comprises a plurality of client computing devices 102A, 102B, 102C and a Web server 104. The Web server 104 may be a computer that is associated with an organization that provides Web content via the Internet. The client computing devices are illustrated as a tablet personal computer 102A, a personal digital assistant ("PDA") 102B, and a telephone 102C. The client computing devices may be associated with a user 106 of the computer system 100. Obviously, these client computing devices should be considered as exemplary and not limiting.

The client computing devices and the server depicted in FIG. 1, are configured to electronically communicate via the network 108. The network 108 may be a LAN or a larger network, such as a wide area network (WAN) or the Internet. As known to those skilled in the art and others, the computer system 100 may be configured to exchange documents, commands, and other types of data between the client computing devices 102A, 102B, 102C, and the Web server 104. As will be appreciated by those skilled in the art and others, the computer system 100 shown in FIG. 1 is a simplified example of one system suitable for implementation of the present invention.

When software formed in accordance with the present invention is implemented in a computer system 100 of the type illustrated in FIG. 1, the software provides a way for users of small form factor computing devices to easily view Web pages designed for larger computing devices. For instance, in one embodiment of the present invention, a user may request a Web page for display at a predetermined magnification. Responsive to receiving the request, the Web page is transmitted from the Web server 104 to one or more client computing devices 102A, 102B, or 102C via the network 108. When transmission is complete, content on the Web page is classified into different cells and displayed. According to another embodiment, a user may issue commands that identify relevant content (i.e., cells) on the displayed Web page. When a command is issued, the Web page is re-rendered and the relevant content is displayed using additional screen space.

Figure 2:
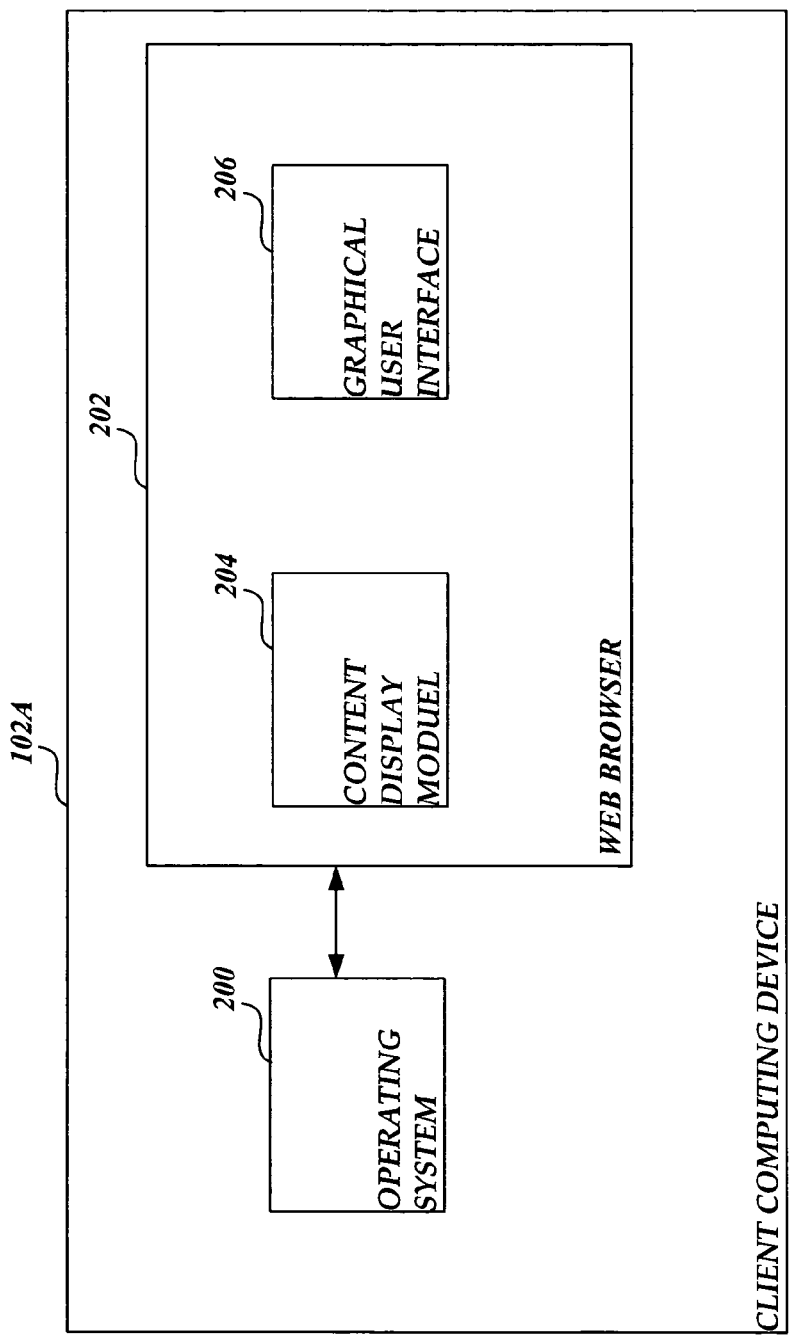
FIG. 2 is a functional block diagram of an exemplary client computing device depicted in FIG. 1.

To provide a context for describing embodiments of the present invention, FIG. 2 illustrates a functional block diagram of the client computing device 102A illustrated in FIG. 1. Components of the client computing device 102A include an operating system 200, a Web browser 202 that maintains a content display module 204, and a graphical user interface 206. The computing device 102A may be any one of a number of computing devices including, but not limited to, tablet personal computers, hand-held computing devices, personal digital assistants, mobile telephones, stand-alone memory devices, electronic devices having some type of memory, and the like. For ease of illustration and because they are not important to an understanding of the present invention, FIG. 2 does not show the typical components of computing device 102A, such as a display, central processing unit, memory, etc. Also, FIG. 2 does not show other computing devices that may be connected to computing device 102A.

As illustrated in FIG. 2, the computing device 102A stores an operating system 200 for controlling the general operation of the computing device 102A and providing services and resources requested by programs such as Web browser 202. The operating system 200 may be a general-purpose operating system that is commercially available such as a Microsoft® operating system, UNIX® operating system, or Linux® operating system. Also, the operating system 202 may be designed specifically for a small form factor computing devices, such as a Palm® operating system. As known to those skilled in the art and others, an operating system performs basic tasks, such as managing the I/O (input and output) of a computing device and tracking data stored in memory. With regard to the present invention, the operating system 200 supports a network connection that allows the Web browser 202 to communicate with remote computing devices.

The computing device 102A also stores a Web browser 202 that is a computer program used to locate and display Web pages. More specifically, a Web browser interprets HTML and other markup languages that define how to display text and graphics to a user. As known to those skilled in the art and others, HTML is the basic language for publishing to the Internet and other computer networks. Also, HTML is a structured markup language, which means that a limited set of tags is used to convey basic information about the structure of a Web page.

As illustrated in FIG. 2, the Web browser 200 stores a content display module 204 for rendering HTML code into a Web page. As a brief summary, the content display module 204 generates a Web browser window when a request for a Web page is received. Then HTML tags in the requested Web page are interpreted to determine the layout of the Web page. When the layout of the Web page is known, the content display module 204 causes the Web browser window to display the requested Web page. In the context of the present invention, the content display module 204 causes the requested Web page to first be displayed in overview mode at a predetermined magnification. Thereafter, the content display module 204 may receive commands from the graphical user interface 206 that identify cells in the requested Web page that may be re-rendered and displayed using additional screen space.

The Web browser 202 also stores a graphical user interface ("GUI") 206 for communicating with a user. As known to those skilled in the art and others, a GUI is an I/O system characterized by the use of graphics on a computer display to communicate with a computer user. Frequently, the user employs an input device, such as an input pen, to manipulate and relocate a pointer on the computer display. When a user activates the input device while the pointer is at a designated position, information is input into the computing device. Accordingly, a user does not need to memorize commands or have knowledge of keyboard typing to provide input into the computing device. As illustrated in FIG. 2, the GUI 206 is interconnected and able to communicate with the operating system 200. As described in more detail below, the operating system 200 notifies the GUI 206 when the user generates an adaptive viewing command. In response, the GUI 206 interprets the adaptive viewing command and causes the content display module 204 to display content in accordance with the adaptive viewing command.

As known to those skilled in the art, FIG. 2 is a simplified example of one computing device 102A capable of displaying Web pages and accepting user commands. Actual embodiments of the computing device 102A and Web browser 202 will have additional components not illustrated in FIG. 2 or described in the accompanying text. Also, FIG. 2 shows one component architecture for rendering Web pages on small form factor computing devices, but other component architectures are possible. For example, Web pages may be split into a set of cells on a remote computing device prior to being transmitted to a client computing device associated with the user. In this alternative embodiment, components of the client computing device 102A, including the content display 204, may be located on a remote computer, such as a Web server or a proxy server. Thus, FIG. 2 should be construed as exemplary and not limiting.

Users may generate and input commands into a computing device in different ways. For example, a mouse may be used to move a pointer and generate commands with "mouse clicks" (i.e., pressing a button on the mouse). One exemplary command generated with a mouse is a selection event where a user employs a "click and drag" gesture to select content displayed on a computer display. However, a mouse is not typically used in conjunction with small form factor computing devices because of the inherent mobility of these devices. Thus, some computing devices are designed to obtain input with an input pen used in conjunction with a touch-sensitive display. The present invention accepts commands from a touch-sensitive display where the direction of the pointer movement is used to differentiate between commands available to the user. In one exemplary embodiment of the present invention, the pointer is activated and the identity of a command is determined when the input pen is rotated a predetermined amount on the computer display. In another exemplary embodiment of the present invention, the pointer is activated and the identity of a command is determined when the input pen is removed from a computer display.

In an exemplary embodiment of the present invention, four adaptive viewing commands are accepted from a touch-sensitive display or other direct contact input mechanism or indirect input mechanism, such as a mouse, each of which allows users to view relevant content in more detail. The adaptive viewing commands accepted are (1) collapse cell, (2) collapse column, (3) expand cell, and (4) expand cell and zoom. Each of these commands and their effect on the content displayed to a user will be described in more detail below with reference to FIGS. 3-10. Even though the examples provided herein illustrate commands made on a touch-sensitive display, one skilled in the art will recognize that other input devices may be used to generate commands in an equivalent manner. Thus, the examples provided below should be construed as exemplary and not limiting.

Figure 3:
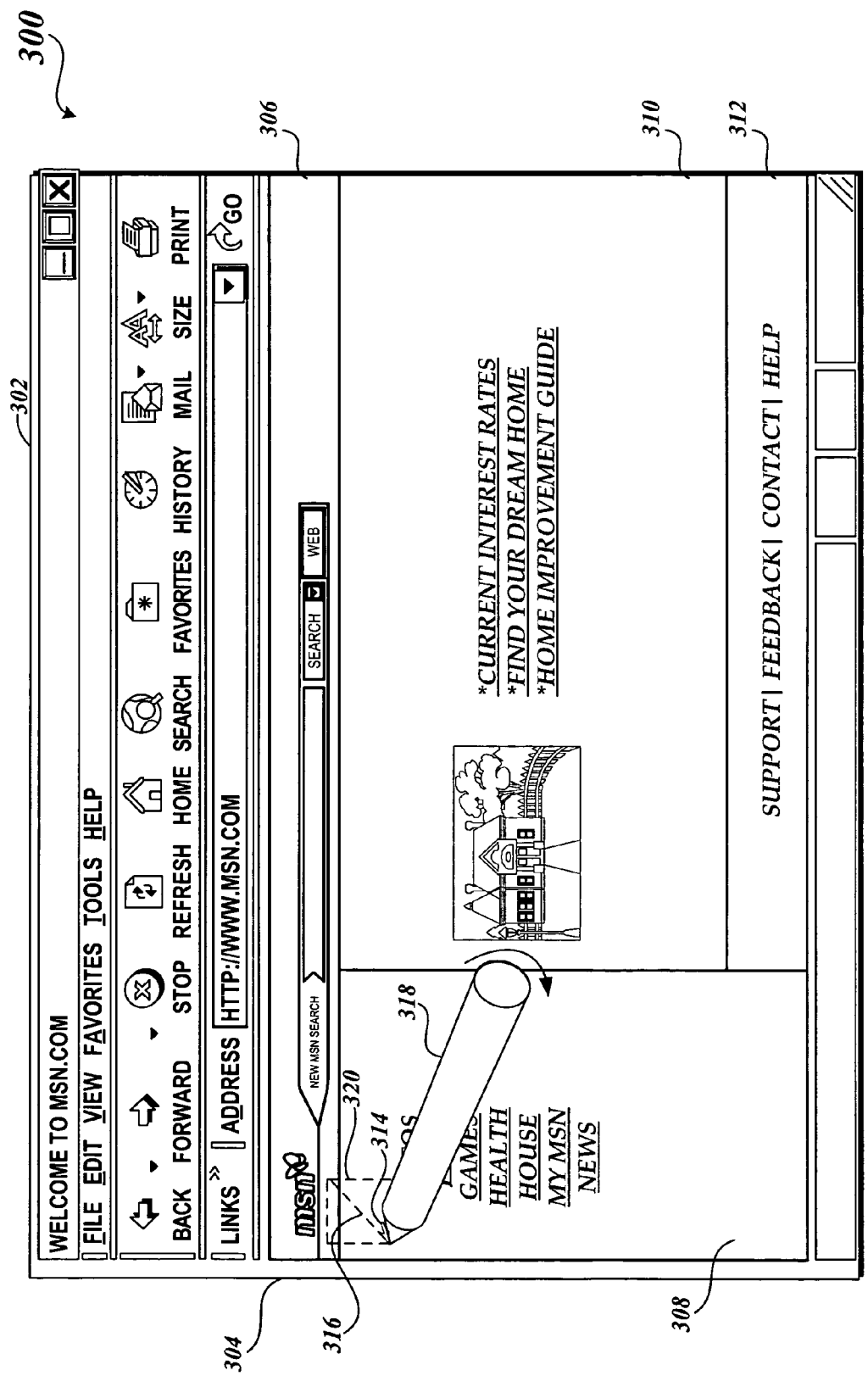
FIG. 3 is a pictorial diagram of a Web browser window in which a user issues an adaptive viewing command in accordance with the present invention.

For illustrative purposes, a representative section of computer display 300 is depicted in FIG. 3. More specifically, the representative section of computer display 300 contains a Web browser window 302 that displays a Web page 304 divided into four cells 306, 308, 310, and 312. The computer display 300 also contains a pointer 314 and a path 316 that represents pointer 314 movement. The pointer 314 movement is generated with the use of the input pen 318 that causes the pointer 314 to move across cells 306 and 308, and also causes a rectangular selection area 320 to be displayed to the user. As illustrated, the pointer 314 movement is directed toward the lower left portion of the computer display 300 and the input pen 318 is rotated when the pointer 314 is located in cell 308.

The present invention accepts commands from a touch-sensitive display where the pointer 314 movement direction is used to differentiate between different commands available to the user. Also, to assist users, feedback is provided in the form of visual indicators from which the selected cells and the command that will be generated may be easily determined. For example, pointer 314 movement may cause a rectangular selection area 320 to be displayed that encloses an area of the computer display 300. The cells selected include those cells that are at least partially located inside the rectangular selection area 320 when the input pen 318 is rotated a predetermined amount. Also, the rectangular selection area 320 provides feedback that allows the user to easily determine the command that will be generated. For example, if the current pointer 314 movement direction is toward the lower-left portion of the computer display 300, the rectangular selection area 320 is outlined with a specific color associated with one adaptive viewing command. Conversely, if the pointer 314 is moved in a different direction, the rectangular selection area 320 is outlined in a different color that is associated with another adaptive viewing command.

In an exemplary embodiment of the present invention, the user identifies the command of collapse cell with pointer 314 movement directed toward the lower left portion of the computer display 300. The command is input into the computing device when the user rotates the input pen 318 on the computer display 300 a predetermined amount. Thus, the pointer 314 movement illustrated in FIG. 3 would cause a collapse cell command to be generated with cells 306 and 308 as the selected cells. As described in further detail below, the collapse cell command causes the Web page 304 to be displayed without the selected cells. Instead, placeholders that occupy a fraction of the screen space replace the selected cells so that relevant content may be displayed using additional screen space. For example, Web pages often contain content, including pop-up ads, flashy banner advertisements, and unnecessary images that users find distracting. Removal of this type of irrelevant content makes screen space available for content the user identifies as being relevant.

Figure 4:
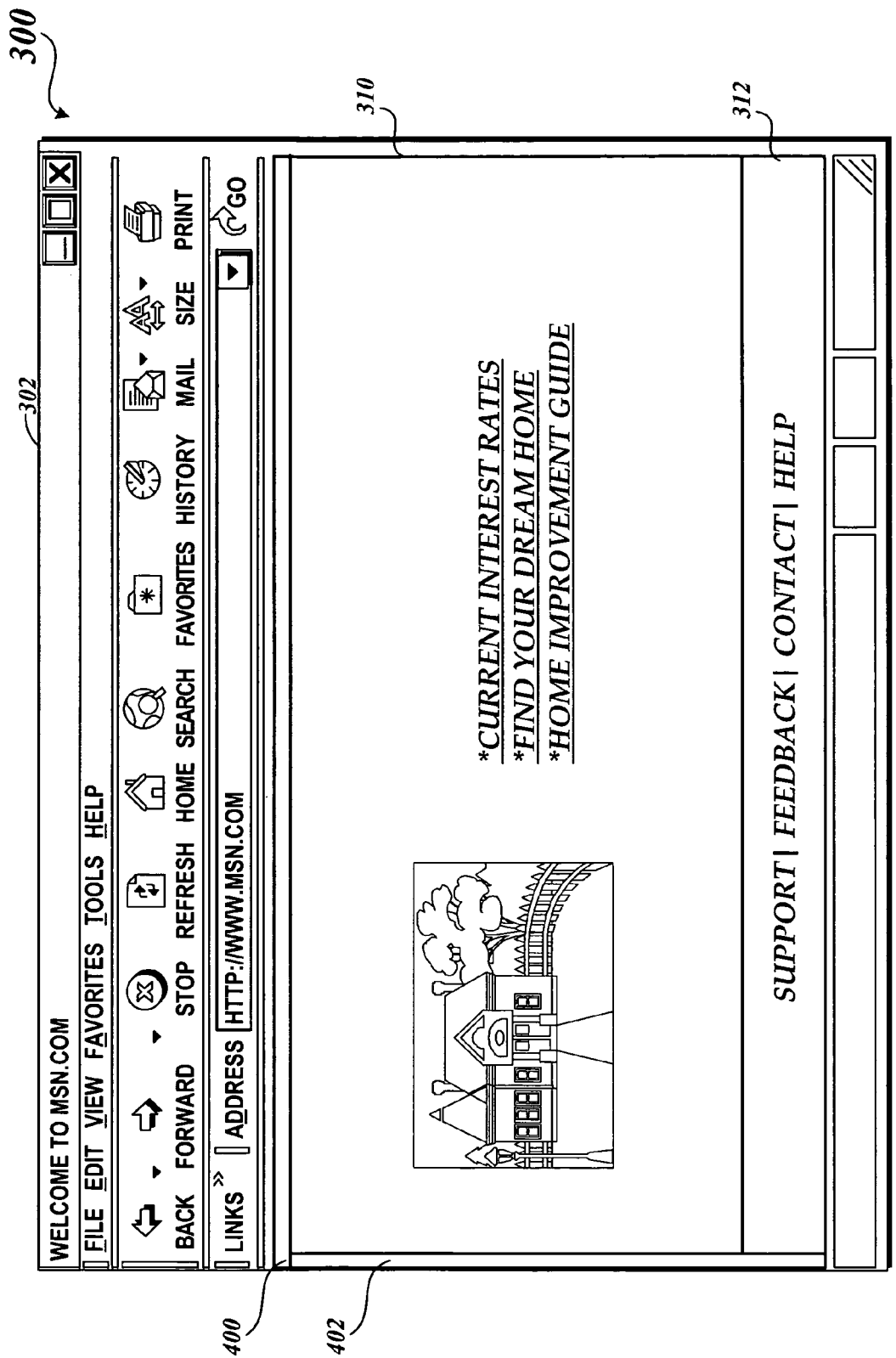
FIG. 4 is a pictorial diagram of a Web browser window with content displayed in accordance with the user-generated adaptive viewing command illustrated in FIG. 3.

FIG. 4 illustrates the sample section of computer display 300 depicted in FIG. 3 after content is displayed because of the user-generated collapse cell command. As illustrated in FIG. 4, the collapse cell command causes selected cells to be replaced with placeholders 400 and 402 that occupy a fraction of the screen space compared to replaced cells 306 and 308. In the example illustrated in FIG. 4, replacement of collapsed cells 306 and 308 with placeholders 400 and 402 allows the nonselected cells 310 and 312 to be displayed using additional area on the computer display 300.

The exact effects of the collapse cell command and other adaptive viewing commands described in further detail below may depend on certain user preferences. For example, FIG. 3 illustrates a Web page 304 displayed in overview mode where the entire width of the Web page 304 is visible. As illustrated in FIG. 4, a collapse cell command causes selected cells to be replaced with placeholders. As a consequence, the content in the non-selected cells is displayed using additional area on the computer display 300. In this example, the overview mode magnification level was set to display all of the Web page. However, the user may set the magnification level at a different value so that some content may not be visible in overview mode or after an adaptive viewing command has been issued.

Figure 5:
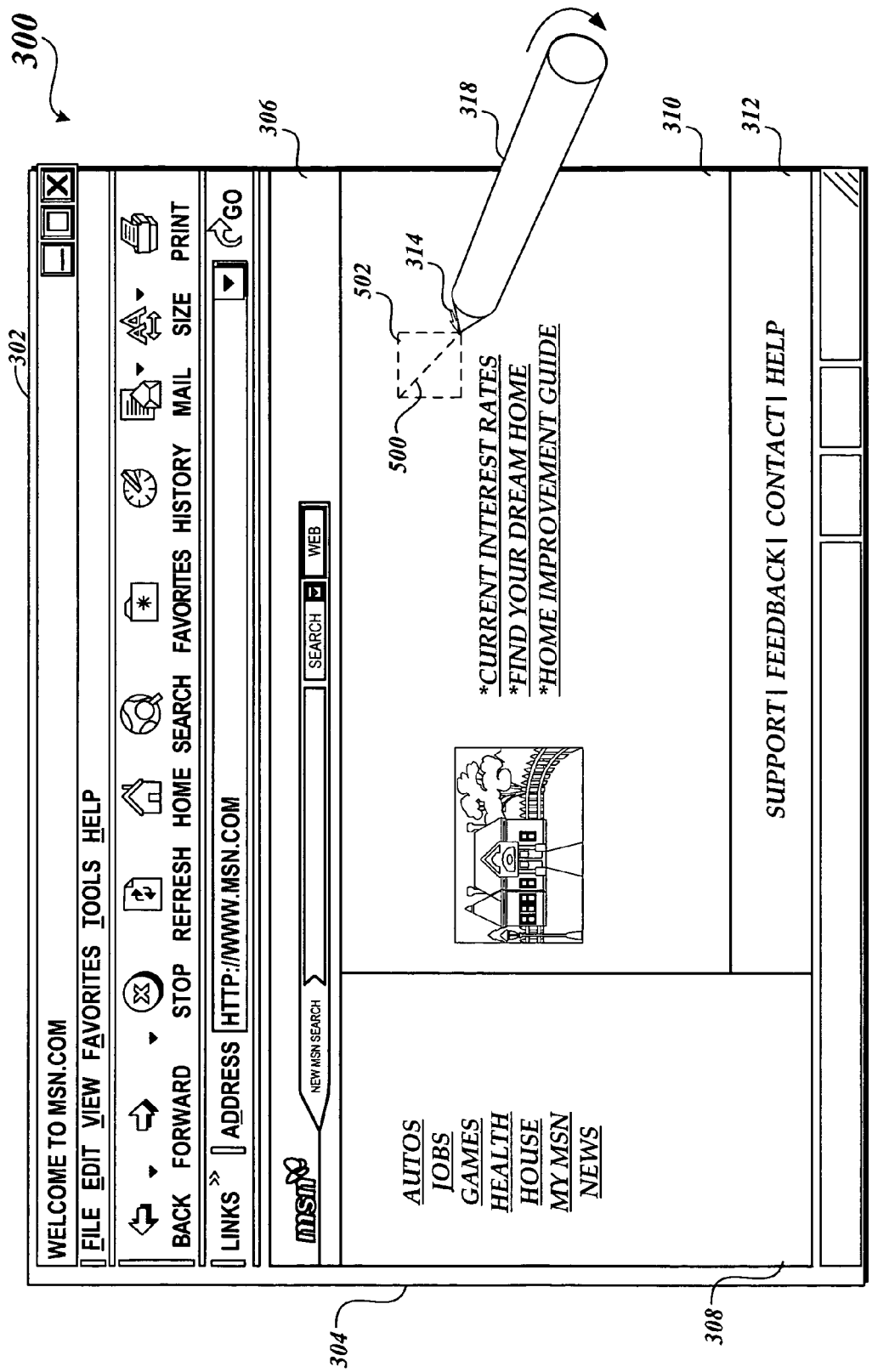
FIG. 5 is a pictorial diagram of a Web browser window in which a user issues an adaptive viewing command in accordance with the present invention.
Figure 6:
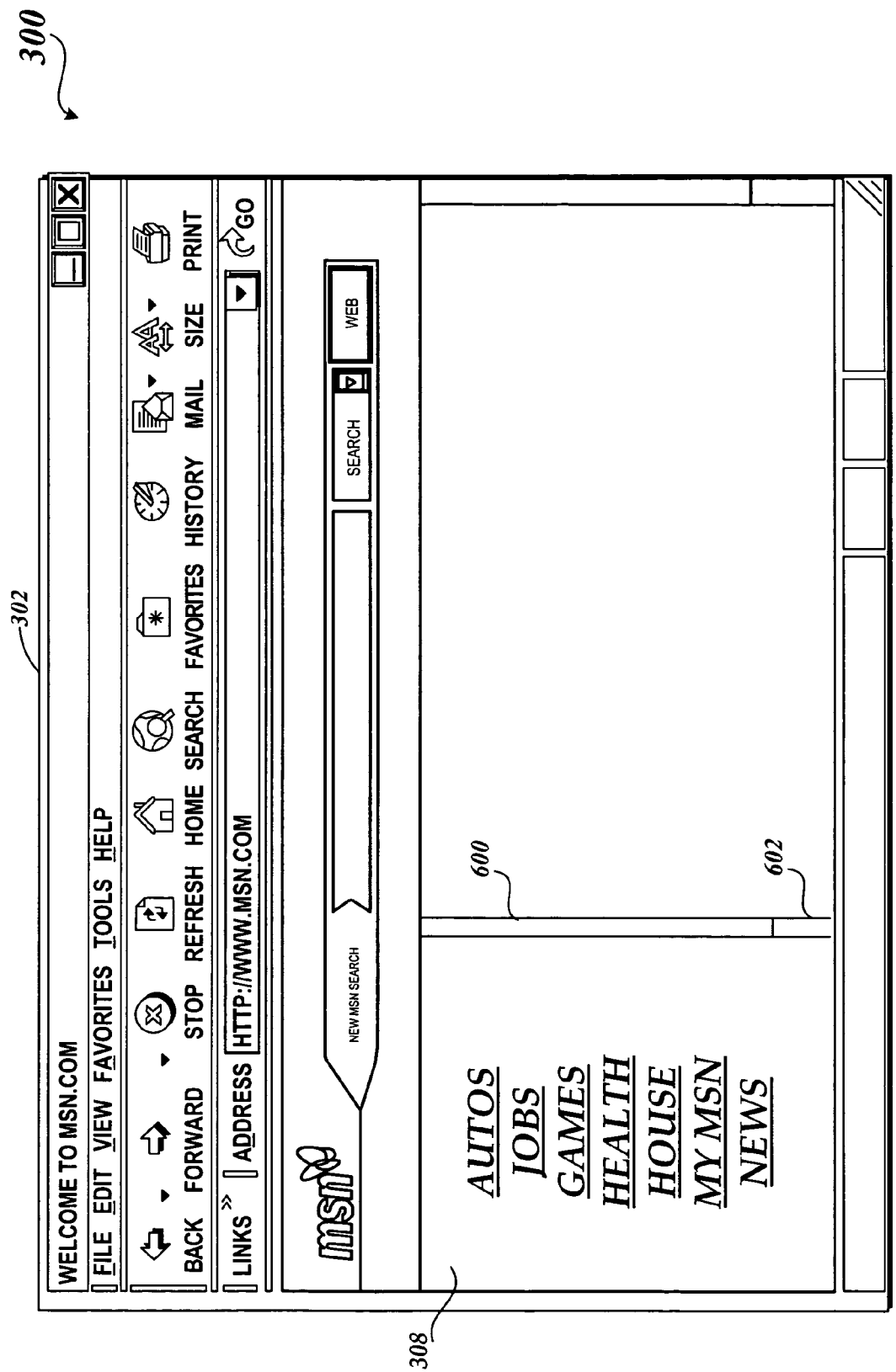
FIG. 6 is a pictorial diagram of a Web browser window with content displayed in accordance with the user-generated adaptive viewing command illustrated in FIG. 5.

Now with reference to FIGS. 5 and 6, the collapse column command and the effects of the command on the content displayed to the user will be described. FIG. 5 illustrates the same representative section of computer display 300 illustrated in FIG. 3, which includes Web browser window 302, Web page 304, cells 306, 308, 310, and 312, and pointer 314. As depicted in FIG. 5, the input pen 318 is moved across zone 310 along path 500, which causes the rectangular selection area 502 to be displayed to the user. Also, the pointer 314 movement is directed toward the lower right portion of the computer display 300 and the input pen 318 is rotated when the pointer 314 is located in cell 310. In an exemplary embodiment of the present invention, the user generates the adaptive viewing command of collapse column by generating pointer 314 movement toward the lower right portion of the computer display 300 and rotating the input pen 318 a predetermined amount. Thus the input pen 318 movement illustrated in FIG. 5 would cause a collapse column command to be generated with the column associated with cell 310 being selected.

A column is comprised of one or more cells that occupy the same horizontal coordinates on the computer display. Thus, the selected column in FIG. 5 consists of cells 310 and 312. FIG. 6 illustrates the sample section of computer display 300 depicted in FIG. 5 after the content is displayed as a result of the user-generated collapse column command. As illustrated in FIG. 6, the collapse column command causes cells in the selected column to be replaced with placeholders 600 and 602. Similar to the collapse cell command described above, the collapse column command allows the nonselected cells 306 and 308 to be displayed using additional area on the computer display 300.

Figure 7:
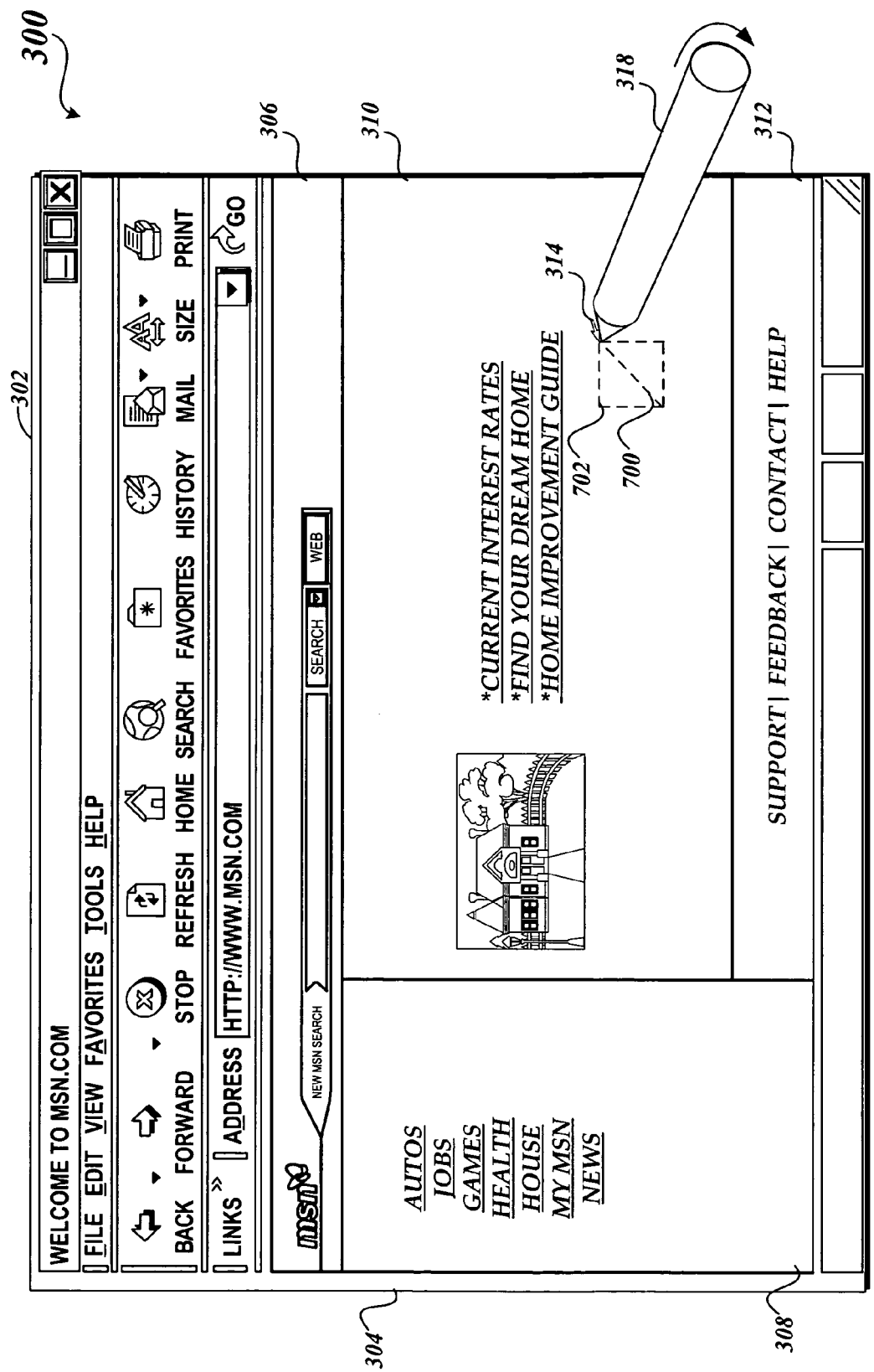
FIG. 7 is a pictorial diagram of a Web browser window in which a user issues an adaptive viewing command in accordance with the present invention.

Now with reference to FIGS. 7 and 8, the expand cell command will be described. FIG. 7 illustrates the same representative section of computer display 300 depicted in FIGS. 3 and 5, which includes Web browser window 302, Web page 304, cells 306, 308, 310, and 312, and pointer 314. As illustrated, the input pen 318 is moved across zone 310 along path 700, which causes the rectangular selection area 702 to be displayed to the user. Also, the pointer 314 movement is directed toward the upper right portion of the computer display 300 and the input pen 318 is rotated when the pointer 314 is located in cell 310. In an exemplary embodiment of the present invention, the user generates the adaptive viewing command of expand cell by generating pointer 314 movement toward the upper right portion of the computer display 300 and rotating the input pen 318 a predetermined amount. Thus, the input pen 318 movement illustrated in FIG. 7 would cause an expand cell command to be generated with cell 310 being the selected cell.

Figure 8:
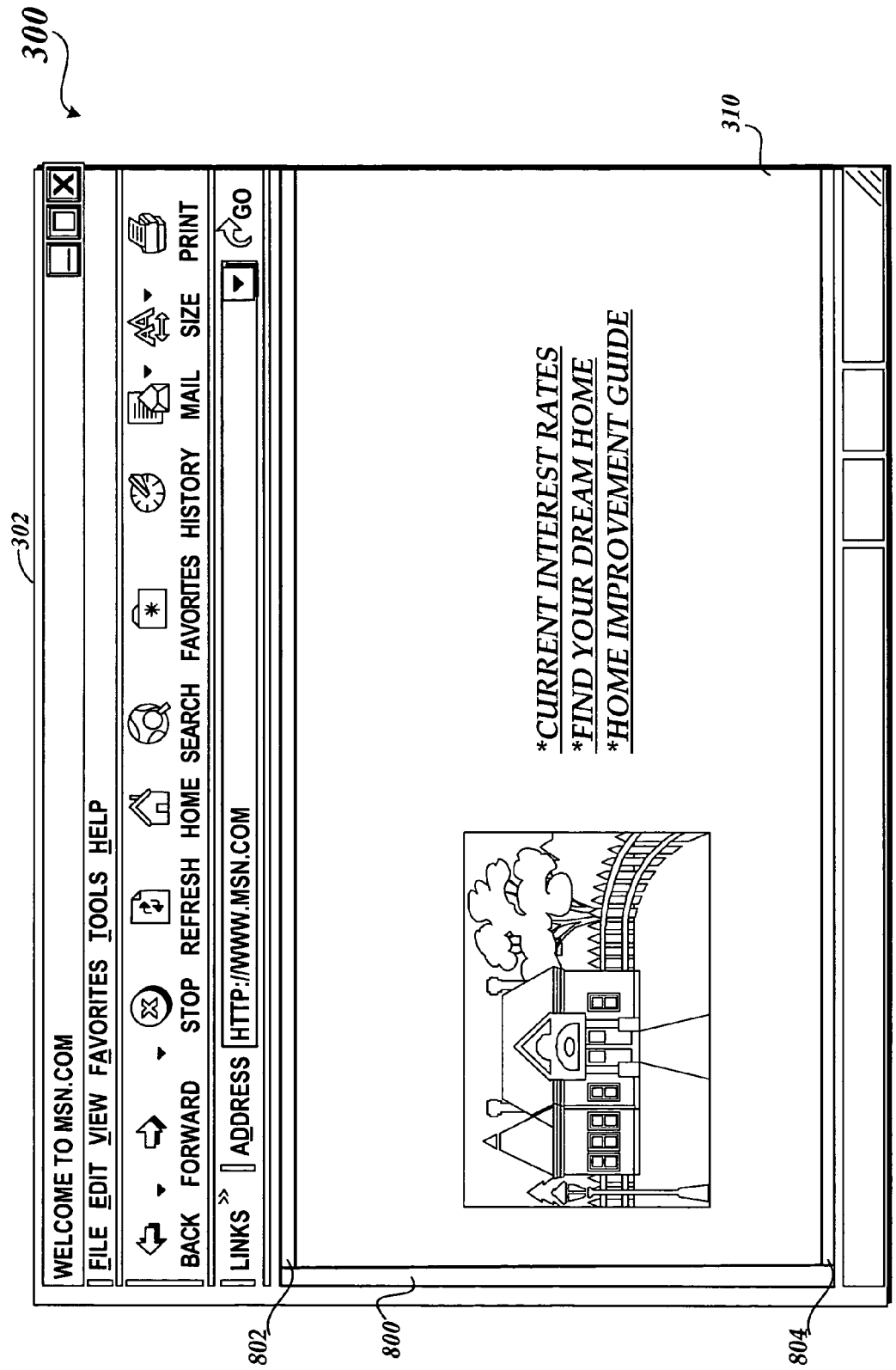
FIG. 8 is a pictorial diagram of a Web browser window with content displayed in accordance with the user-generated adaptive viewing command illustrated in FIG. 7.

FIG. 8 illustrates the sample section of computer display 300 depicted in FIG. 7 after the content is displayed as a result of the user-generated expand cell command. As illustrated in FIG. 8, the expand cell command is the converse of the collapse cell command described above. Stated differently, the expand cell command causes nonselected cells to be replaced with placeholders 800, 802, and 804, which allows the selected cell 310 to be displayed using additional area on the computer display 300.

Figure 9:
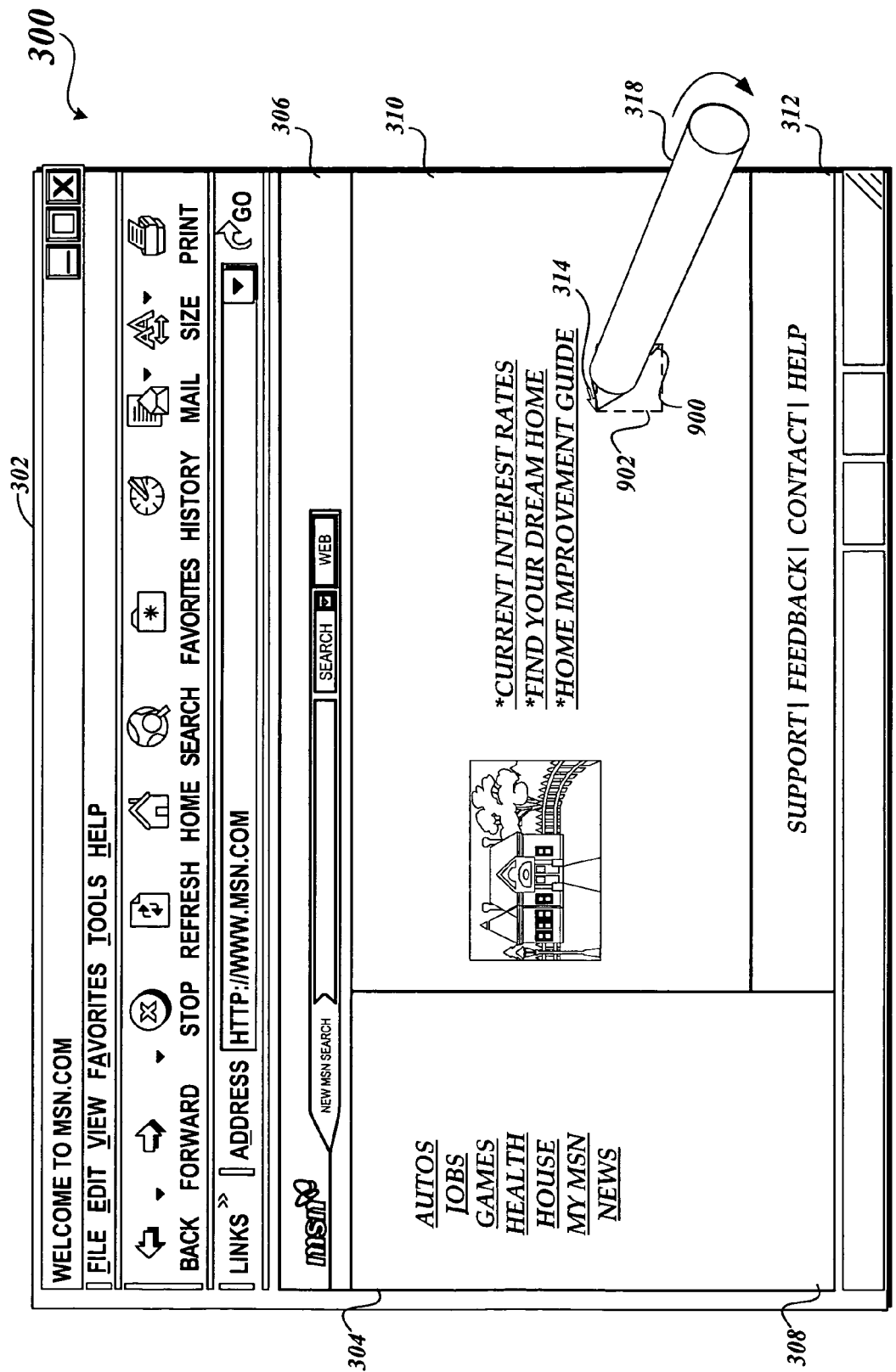
FIG. 9 is a pictorial diagram of a Web browser window in which a user issues an adaptive viewing command in accordance with the present invention.

Now with reference to FIGS. 9 and 10, the expand cell and zoom command will be described. FIG. 9 illustrates the same representative section of computer display 300 depicted in FIGS. 3, 5, and 7, which includes Web browser window 302, Web page 304, cells 306, 308, 310, and 312, and pointer 314. As illustrated, the input pen 318 is moved across zone 310 along path 900, which causes the rectangular selection area 902 to be displayed. Also, the pointer 314 movement is directed toward the upper left portion of the computer display 300 and the input pen 318 is rotated when the pointer 314 is located in cell 310. In an exemplary embodiment of the present invention, the user generates the command of expand cell and zoom by generating pointer 314 movement toward the upper left portion of the computer display 300 and rotating the input pen a predetermined amount. Thus, the input pen 318 movement illustrated in FIG. 9 would cause an expand cell and zoom command to be generated with cell 310 being selected.

Figure 10:
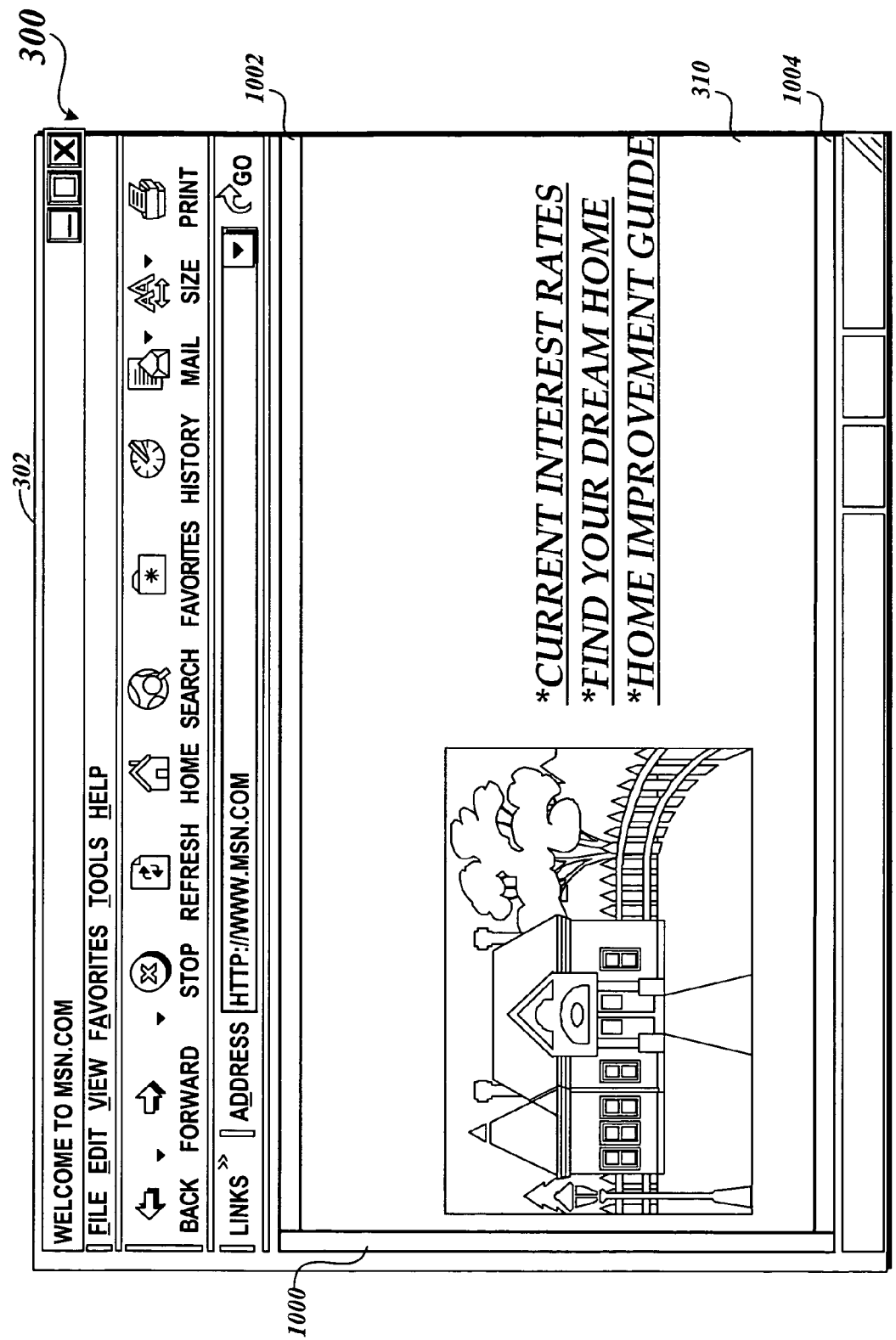
FIG. 10 is a pictorial diagram of a Web browser window with content displayed in accordance with the user-generated adaptive viewing command illustrated in FIG. 9.

FIG. 10 illustrates the sample section of computer display 300 depicted in FIG. 9 after the content is displayed as a result of the user-generated expand cell and zoom command. Similar to the expand cell command described above, the expand cell and zoom command causes nonselected cells to be replaced with placeholders 1000, 1002, and 1004, which allows the selected cell 310 to be displayed using additional area on the computer display 300. However, the expand cell and zoom command also allows the user to set a magnification level to display the selected content. In an exemplary embodiment of the present invention, the magnification level that a selected cell is displayed after an expand cell and zoom command is a user preference that may be accessed and changed from the GUI 206 (FIG. 2).

It should be well understood that the method of generating commands, as described above, is exemplary and may be changed to accommodate the needs of users. For example, FIGS. 3, 5, 7, and 9 illustrate a method of generating commands for a right-handed user (i.e., the input pen is rotated in the clockwise direction). Without departing from the scope of the present invention, the method of generating commands may be changed. For instance, left-handed users may alter user preferences so that a pointer is activated when an input pen is rotated counter clockwise. Also, a left-handed user may alter user preferences so that the method of differentiating between commands (i.e., pointer movement direction) is a "mirror" when compared to the pointer movement direction used by a right-handed user. More generally, the mapping between user-generated input and the commands executed by the present invention may be changed to satisfy the needs of users.

The exemplary embodiment of generating commands as illustrated in FIGS. 3-10 may be used to generate a different set commands than those described above—namely, the (1) collapse cell, (2) collapse column, (3) expand cell, and (4) expand cell and zoom commands. For example, this aspect of the present invention may be used in conjunction with a spreadsheet program. The user may generate a command in the spreadsheet program by moving the pointer across the computer display and activating the pointer. Similar to the embodiments described above, the direction the pointer was moved determines the command that will be issued. In this instance, a user or developer may determine that activation of the pointer after the pointer was moved toward the upper right portion of the computer display causes the command of "delete" to be issued. More generally, any application used in conjunction with the present invention may assign a set of commands to be issued based on pointer movement direction.

In another embodiment of the present invention, the adaptive viewing commands described above are generated using a different input mechanism. For example, some small form factor computing devices (i.e., a smart phone) do not obtain input with a device like a mouse or input pen. Instead, buttons on the computing device are used to identify commands. In this embodiment, the adaptive viewing commands described above—namely, (1) collapse cell, (2) collapse column, (3) expand cell, and (4) expand cell and zoom commands—may be issued from an embedded hardware system, such as a button on a smart phone. As another example, a Web page may be displayed with visual indicators that represent commands. In this instance, a user may use an input pen to "tap" a visual indicator to have the command represented by the visual indicator issue. More generally, small form factor computing devices are designed with a variety of different input mechanisms, depending on the size and purpose of the device. The adaptive viewing commands supported by the present invention may be generated from any one of these input mechanisms.

When an adaptive viewing command causes a Web page to be displayed with one or more placeholders instead of cells, the user may cause additional commands to be executed for improved viewing of the Web page. Stated differently, cells displayed to a user may be susceptible to further divisions after an adaptive viewing command has already been generated. In this instance, all of the adaptive viewing commands described above—namely, the (1) collapse cell, (2) collapse column, (3) expand cell, and (4) expand cell and zoom commands—are available for selecting and viewing content in subdivided cells. Also, the placeholders may be restored with another user-generated command. For example, the present invention accepts commands from a touch-sensitive display including the known command of following a hyperlink using a "tap" of an input pen. The same command is acceptable to identify a collapsed cell that a user wants restored. Stated differently, a user may "tap" on a placeholder that represents a collapsed cell. In response, a Web page will be displayed that includes the identified cell.

The present invention may be used in conjunction with other features available from most Web browser programs. For example, most Web browsers allow users to "bookmark" a Web page so that the Web page may easily be recalled at a later time. With regard to the present invention, a Web page may be displayed with one or more cells replaced with placeholders. This altered Web page may also be "bookmarked" and recalled at a later time. This aspect of the present invention allows users of small form factor computing device to directly access relevant content without having to repetitively issue commands.

Figure 11:
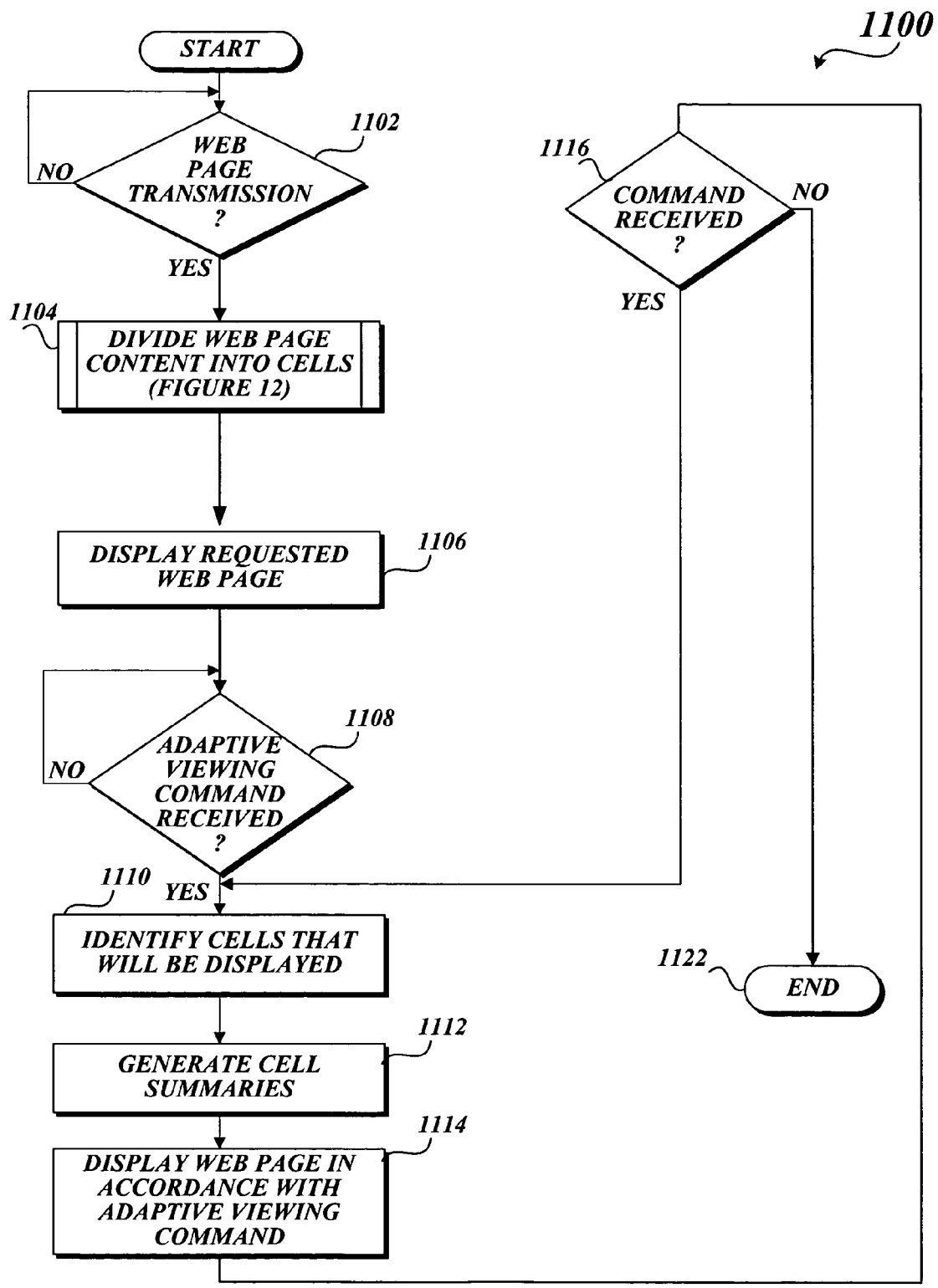
FIG. 11 is a flow diagram of one exemplary method for displaying a Web page in response to an adaptive viewing command.

FIG. 11 is a flow diagram illustrating one exemplary embodiment of an adaptive rendering method 1100 formed in accordance with the present invention. In summary, the adaptive rendering method 1100 receives a request, such as a request for a Web page that utilizes the HTTP protocol. In response to receiving the request, the method 1100 divides the requested Web page into cells. When the requested Web page is displayed, the adaptive rendering method 1100 accepts adaptive viewing commands that identify a subset of cells on the Web page that may be displayed using additional screen space. With continuing reference to FIGS. 1-10 and the accompanying descriptions, an adaptive rendering method 1100 illustrated in FIG. 11 will now be described.

At decision block 1102, the adaptive rendering method 1100 remains idle and waits for a Web page transmission from a server-based computing device. As known to those skilled in the art and others, a user may make a Web page request with the use of an existing Web browser program, e-mail program, and/or other client-based software application capable of communicating over a network. In the context of the present invention, the request may be generated from a client computing device, such as client computing devices 102A, 102B, and 102C (FIG. 1), using a client-based software application such as Web browser 202. In response, a server computing device, such as Web server 104, transmits the requested Web page back the client computing device where the request originated.

At block 1104, one aspect of the present invention adds program code to the requested Web page that divides content into a set of cells. One embodiment of a method for dividing a Web page into a set of cells is described below with reference to FIG. 12. When the Web page is displayed to the user, the additional program code allows users to issue adaptive viewing commands and have some cells on the Web page displayed using additional screen space. As will be described in more detail below, block 1104 may be implemented on a client computing device or on a remote computing device, such as a Web server or a proxy server.

At block 1104, 1106 an existing system (i.e., already realized) displays the requested Web page. As known to those skilled in the art and others, Web pages are stored in a standardized notation, such as markup languages, created for structured document exchange. HTML is one example of a markup language where specially-designated constructs referred to as "tags" are used to delimit (or "markup") content. More specifically, a tag is typically composed of a string enclosed in special characters that gives instructions regarding the layout of the Web page. For example, the words put into a "<title>" tag will display in the title bar of a Web page. At block 1106, an existing system parses HTML code of the requested Web page displaying content in accordance with HTML tags embedded in the page. Also, the existing system displays the page at a predetermined magnification level that is stored as a user preference.

At block 1108 the adaptive rendering method 1100 remains idle and waits for an adaptive viewing command. As described above with reference to FIGS. 3-10, the present invention accepts the adaptive viewing commands of (1) collapse cell, (2) collapse column, (3) expand cell, and (4) expand cell and zoom. In one embodiment, the four commands are accepted from a touch-sensitive display or other direct contact input mechanism. As known to those skilled in the art and others, the user may operate an input device to manipulate and relocate a pointer and activate the pointer at designated positions on the computer display. The operating system monitors pointer events and provides a mechanism for computer programs, such as Web browser 202, to perform actions in response to these events.

The adaptive rendering method 1100 identifies cells at block 1110 that will be displayed in response to the user-generated adaptive viewing command received at block 1108. When the operating system receives an event indicative of an adaptive viewing command, the event and event data are communicated to the adaptive rendering method 1100. More specifically, the pointer movement direction and the coordinate positions occupied by the rectangular selection area are communicated when a pointer activation event occurs (i.e., the pointer is rotated on a computer display a predetermined amount). From the movement direction of the pointer and the coordinate position occupied by the rectangular selection area, the adaptive rendering method 1100 is able to identify cells that will be displayed. Stated differently, the pointer movement direction is indicative of the adaptive viewing command that was generated. Also, from the coordinates occupied by the rectangular selection area, the cells that a user selected are easily identified. Given these two inputs, namely, the command that was generated and the cells that were selected, the adaptive rendering method 1100 is able to identify the subset of cells that will be displayed using mathematical functions and methods generally known in the art.

At block 1112, cell summaries that may viewed from placeholders of replaced cells are generated. A cell summary provides a preview of a cell to assist users in determining whether to have a cell displayed. Typically, Web pages are designed with important content displayed more prominently than less important content. At block 1112, the adaptive rendering method 1100 identifies cell summaries that will be displayed in placeholders. The HTML tags in the requested Web page are parsed and content designed to be displayed in a prominent way compared to other content on the Web page is identified. Factors that may be used, individually or collectively, to identify prominently displayed content include large font sizes, bold and/or underlined text, and the location of the content in the cell. The content designed to be displayed in a prominent way is extracted and located inside a placeholder as a cell summary.

At block 1114, an existing system displays the Web page in accordance with the adaptive viewing command received at block 1108. Similar to the description provided at block 1104, the existing system parses HTML code, generating a Web page in accordance with that HTML code. In some instances, the magnification level of the displayed cells is set by the user. For example, the command of expand and zoom allows a user to set the magnification level at any value. In other instances, the requested cells are displayed using a default magnification value. Regardless, additional screen space is available to display relevant content since at least one cell was "collapsed" (i.e., replaced with a placeholder) as a result of the adaptive viewing command received at block 1108.

At decision block 1116, the adaptive rendering method 1100 remains idle and waits for a command. When a Web page is displayed with one or more placeholders, the user may generate additional adaptive viewing commands. Also, a user may cause the Web page to be displayed with a previously collapsed cell by using an input pen to "tap" on a placeholder that represents the collapsed cell. In either instance, when the operating system receives a command (i.e., event) handled by the present invention, the adaptive rendering method 1100 obtains notice of the event along with event data. If a command is received, the adaptive rendering method 1100 proceeds back to block 1110 described above. Conversely, if a command is not received, the adaptive rendering method proceeds to block 1120 where it terminates. In actual embodiments of the present invention, the method 1100 could be terminated at any point by the user. For example, the method 1100 is implemented in conjunction with a Web browser. As is well known to those skilled in the art and others, a user may terminate execution of a Web browser using a graphical user interface object available from a Web browser window.

While blocks 1110 through 1114 of the adaptive rendering method 1100 describe the process of displaying a subset of cells from a Web page, an equivalent process is used to display cell subdivisions. However, instead of Web pages being divided into cells at block 1104, a cell is divided into cell subdivisions. The cell subdivisions then become the basic units that may be selected and displayed using the adaptive rendering method 1100. As described in further detail below, separators are used to identify the demarcation line between both cells and cell subdivisions. Thus, the process of accepting adaptive viewing commands and displaying a subset of cells or cell subdivisions in response to these commands is equivalent.

Implementations of the present invention are not limited to the method 1100 shown in FIG. 11, as other exemplary methods may perform steps in a different order than described above. For example, aspects present invention may be implemented on a client computing device associated with a user or on a remote computing device, such as a Web server or a proxy server. FIG. 11 describes an embodiment where a Web page is first transmitted to a client computing device (at block 1102) and then divided into a set of cells on the client computing device (at block 1104). In embodiments where a Web page is split into a set of cells on a Web server, blocks 1102 and 1104 will be performed in a reverse order than illustrated in FIG. 11.

Figure 12:
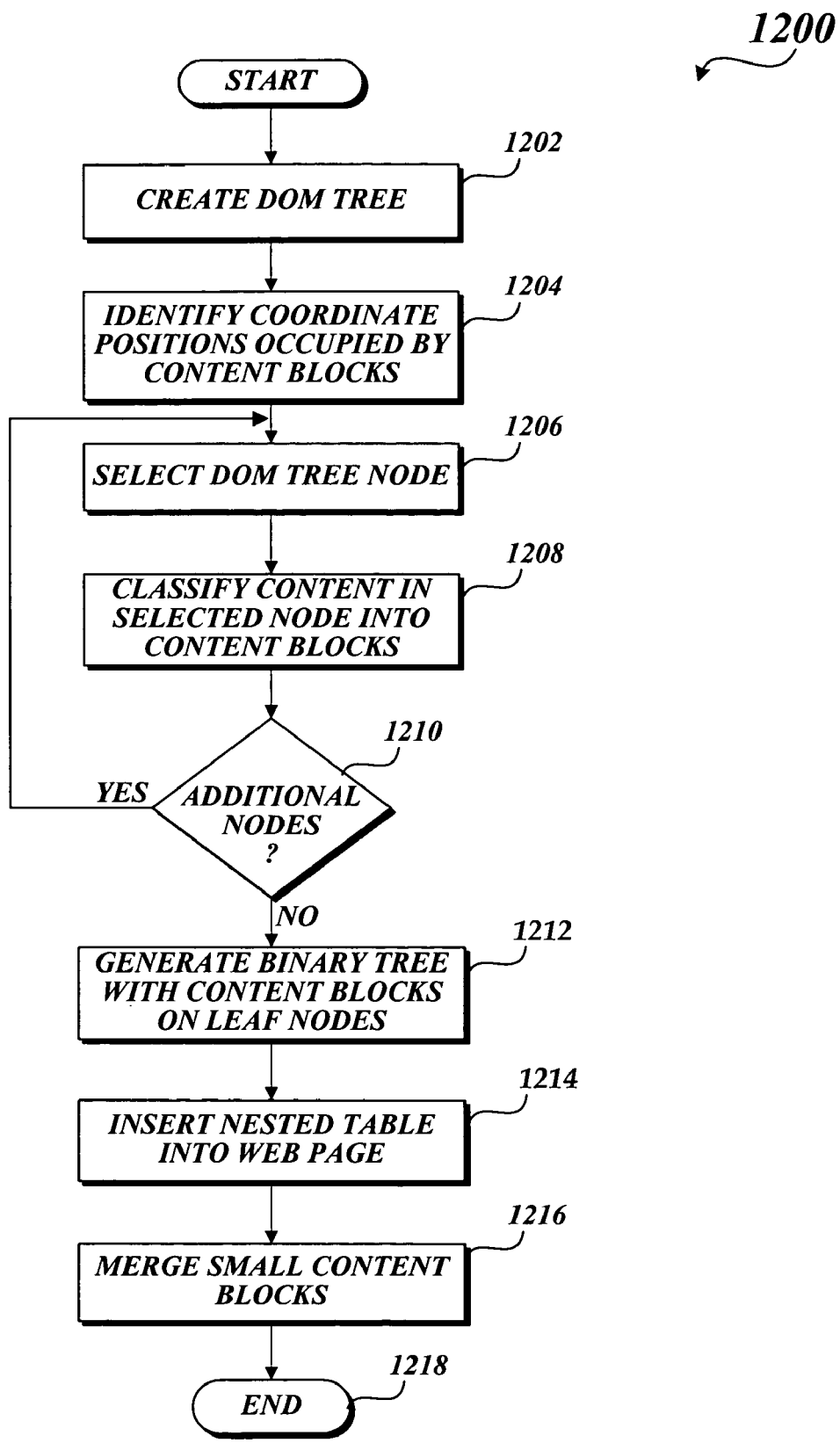
FIG. 12 is a flow diagram of one exemplary method for generating a nested table that permits cells to be selected in accordance with the method illustrated in FIG. 11.

FIG. 12 is a flow diagram illustrating one exemplary embodiment of a splicing method 1200 formed in accordance with the present invention. As described above (with reference to block 1104 of FIG. 11), this aspect of the present invention adds code to the requested Web page that divides the page into a set of cells and generates a scalable page structure.

As illustrated in FIG. 12, the splicing method 1200 begins at block 1202 where a Document Object Model ("DOM") tree is generated from the requested Web page using an HTML parser. In the DOM, the World Wide Web Consortium has defined a complete set of objects for processing markup documents such as HTML documents. As known to those skilled in the art and others, an HTML parser may be used to generate a DOM tree from an HTML document. With a DOM tree representation of an HTML document, information about the HTML document may easily be extracted. Also, DOM trees are highly editable and may be used to alter and reconstruct a complete HTML document.

At block 1204, position and dimension information occupied by content blocks in the Web page is identified. Typically, a Web page author will partition content with visual separators such as blank space. For example, a common practice among Web page designers is to create a navigation bar that contains links along the left-hand portion of a Web page. More generally, Web pages are often designed using a template where blank space divides the content blocks commonly known as a header, left sidebar, right sidebar, body, and footer. At block 1204, the coordinates occupied by content blocks are identified by analyzing the shape, size, and location of content on the Web page along with the location of associated visual separators. For example, content that is located near the top of a Web page and is separated from other content with a horizontal visual separator may be identified as being in the header content block. However, there may be more than one visual separator located near the top of a Web page. Simply stated, a visual separator located near the top of a Web page encompassing an area that is flat and wide is identified as being the demarcation line for the header. The footer, body, left sidebar, and right sidebar may be identified using similar methods that account for the shape, size, and location of the content block in relation to visual separators. As known to those skilled in the art and others, a Web page does not necessarily have all of the content blocks described above. Thus, at block 1204, the method may determine that one or more high-level content blocks do not exist. A detailed description of a system and method that identifies coordinate positions occupied by content blocks may be found in commonly assigned application Ser. No. 10/306,729, titled SMALL FORM FACTOR WEB BROWSING, filed Nov. 27, 2002, the content of which is expressly incorporated herein by reference.

At block 1206, the splicing method 1200 selects a node on the DOM tree generated at block 1202. As described above, content in a Web page is stored as nodes on the DOM tree. For each node selected, the splicing method 1200 associates content stored in the selected node with the content block where the content will be displayed.

At block 1208 the position and dimension information of content stored in the selected node are compared to the position and dimension information of the content blocks. As described above (at block 1204), the location of content blocks is determined by analyzing the shape, size, and location of content on a Web page and the visual separators that partition content. At block 1208, the splicing method compares the location of content stored in the DOM tree with the position and dimension information occupied by the different content blocks. Through this comparison, the method is able to classify each node in the DOM tree into associated content blocks.

At decision block 1210, a test is conducted to determine whether additional nodes in the DOM tree will be selected. In an exemplary embodiment of the present invention, the DOM tree is traversed until all nodes are selected and classified into content blocks. Since algorithms for traversing tree data structures are generally known in the art, the algorithm used to traverse the DOM tree will not be described in further detail here. If at least one node in the DOM tree has not been selected, then the splicing method 1200 proceeds back to block 1206 and blocks 1206 through 1210 repeat until all of the nodes have been selected. Conversely, if all of the nodes in the DOM tree have been selected, then the splicing method 1200 proceeds to block 1212 described below.

As mentioned previously, HTML code is added to the requested Web page before the page is displayed. The content on the Web page is not altered by the present invention. However, a nested table is generated and content blocks are placed inside cells of the nested table. The borders of the cells in the nested table correspond to the visual separators that partition content blocks. As described in further detail below, a binary tree is used to store content blocks and generate the nested table.

At block 1212, the slicing method 1200 generates a binary tree data structure with content blocks being stored in the leaf nodes of the tree. As described above with reference to block 1208, content stored in nodes of the DOM tree is sorted into content blocks. At block 1214, the slicing method 1200 stores the sorted content blocks in a binary tree designed for fast traversal. When content blocks are stored in the leaf nodes of a binary tree in this way, a nested table may easily be generated that partitions the content blocks into a set of cells. As known to those skilled in the art and others, a binary tree is one data structure suitable to store content blocks and the embodiment described herein should be construed as exemplary and not limiting.

At block 1214, nested tables suitable to be displayed on a Web page in accordance with the adaptive viewing method 1100 (described above with reference to FIG. 11) are generated. In an exemplary embodiment, the binary tree generated at block 1212 is traversed using a recursive traversal algorithm. Each content block in the binary tree is analyzed to determine whether the content block is oriented horizontally or vertically. If a content block is oriented horizontally, a horizontal table with a left-hand and a right-hand cell is created. Conversely, if a content block is oriented vertically, a vertical table with a top and bottom cell is created. In either instance, data that represents a content block, which is stored in a leaf node in the binary tree, is placed inside one cell of a newly created table. The remaining cell is used to continue the process of analyzing content blocks and generate additional (i.e., nested) tables. When all of the content blocks in the binary tree have been analyzed, the nested table is placed in a Web page suitable to be displayed to a user.

In an alternative embodiment, the content blocks are inserted into a standard table that is not nested. In this embodiment, a binary tree is not created at block 1212. Instead, a tree data structure that does not use a predetermined number of leaf nodes is used to store content blocks. This embodiment is slower than the embodiment described above but has the benefit of being suitable for creating a standard table that is not nested. As known to those skilled in the art and others, a nested table may be difficult for some, typically older, Web browsers to display.

In some instances, content blocks are detected even though they are small when compared to other content blocks on the Web page. At block 1216, the splicing method 1200 merges some content blocks because displaying small content blocks is undesirable. More specifically, the present invention analyzes the size and position of content blocks to determine whether two or more blocks should be merged. If two blocks are adjacent and both their height and width are below a predetermined threshold, then the splicing method 1200 merges the two content blocks into a single content block. Then, the splicing method proceeds to block 1218 where it terminates.

Implementations of the present invention are not limited to the exemplary method 1200 shown in FIG. 12. The method 1200 may include additional actions or eliminate some actions. For example, Web page designers may identify explicit separators in addition to the implicit separators (i.e., blank space) when dividing content on a Web page. These explicit separators may be identified from the tags embedded in an HTML document. As known to those skilled in the art and others, explicit separators are not typically used to divide high level content blocks. Instead, explicit separators are typically used to separate content in cells into a set of cell subdivisions. Thus, at block 1204, the slicing method 1200 may be configured to identify explicit separators embedded as tags in the Web page. Since explicit separators are typically used to divide small areas of content, this embodiment is most relevant when the slicing method 1200 is used to divide a cell into a set of cell subdivisions. Thus, the slicing method 1200 depicted in FIG. 12 provides one example of the manner in which an embodiment of the invention may be implemented.

Also, the exemplary method 1200 shown in FIG. 12 may be performed using additional or fewer steps than shown. For example, one aspect of the present invention allows developers to identify where cells are located on a Web page. In this instance, blocks 1202-1210 may be replaced with a step where the method 1200 identifies the location of cells as dictated by the developer.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computing device that includes an operating system and a Web browser, a method of displaying only relevant content of a Web page, comprising:
    displaying the Web page including relevant and non-relevant content in an overview mode at a predetermined magnification;
    dividing the Web page into a plurality of cells, wherein each cell comprising either relevant or non-relevant content by:
        creating a document object mode tree representation of the Web page;
        determining the area occupied by each content block on the Web page by identifying coordinate positions occupied by each content block;
        classifying content stored in nodes of the document object model tree into their associated content blocks by comparing position and dimension information of content stored in the nodes to the position and dimension of the content blocks;
        storing the content blocks into a multi-celled table; and
        inserting the multi-celled table in a modified Web page such that the modified web page comprises the multi-celled table in addition to the relevant and non-relevant content of the Web page; and
    in response to receiving a user-generated command to identify the relevant content of the Web-page, displaying only the relevant content of the Web page by:
        identifying cells from the Web page comprising relevant content that will be displayed;
        identifying cells from the Web page comprising non-relevant content that will not be displayed; and
        displaying the identified cells comprising the relevant content, wherein the displayed cells are magnified by an amount equal to the space freed by the cells that will not be displayed.

2. The method of claim 1, further comprising merging adjacent cells in the multi-celled table that are smaller than a predetermined threshold.

3. The method of claim 1, wherein creating a document object model tree representation of the Web page includes using a parser to extract content from a hypertext markup language document.

4. The method of claim 1, wherein determining the area occupied by each content block includes identifying visual separators on the Web page that divide content.

5. The method of claim 4, further comprising, if one or more visual separators are identified as being the demarcation line between content blocks, selecting the visual separator that causes content blocks to be displayed in accordance with a predetermined shape.

6. The method of claim 4, wherein the visual separators are implicit visual separators that may be identified by determining the location of blank space on the Web page.

7. The method of claim 4, wherein the visual separators are explicit visual separators that may be identified from hypertext markup language tags embedded in the Web page.

8. The method of claim 1, wherein classifying content stored in the document object model tree into content blocks includes:
    traversing the document object model tree; and
    comparing the location of content stored in the nodes of the tree with the area occupied by each content block.

9. The method of claim 1, wherein storing the content blocks into a multi-celled table includes:
    generating a binary tree data structure with content blocks stored in the leaf nodes of the binary tree;
    determining if each content block is oriented horizontally or vertically;
    if a content block is oriented horizontally, creating the multi-celled table with a left cell and a right cell; and
    conversely, if a content block is oriented vertically, creating the multi-celled table with a top and bottom cell.

10. In a computing device that includes an operating system and a Web browser, a method of dividing the Web page into a plurality of cells, comprising:
    creating a document object model tree representation of the Web page;
    determining the area occupied by each content block on the Web page by identifying coordinate positions occupied by each content block;
    classifying content stored in nodes of the document object model tree into their associated content blocks by comparing position and dimension information of content stored in the nodes to the position and dimension of the content blocks;
    storing the content blocks into a multi-celled table; and
    inserting the multi-celled table in a modified Web page such that the modified Web page comprises the multi-celled table in addition to the relevant and non-relevant content of the Web page.

11. The method of claim 10, further comprising merging adjacent cells that are smaller than a predetermined threshold in the multi-celled table.

12. The method of claim 10, wherein creating a document object model tree representation of the Web page includes using a parser to extract content from a hypertext markup language document.

13. The method of claim 10, wherein determining the area occupied by each content block includes identifying visual separators on the Web page that divide content.

14. The method of claim 13, further comprising if one or more visual separators are identified as being the demarcation line between content blocks, selecting the visual separator that causes content blocks to be displayed in accordance with a predetermined shape.

15. The method of claim 13, wherein the visual separators are implicit visual separators that may be identified by determining the location of blank space on the Web page.

16. The method of claim 13, wherein the visual separators are explicit visual separators that may be identified from hypertext markup language tags embedded in the Web page.

17. The method of claim 10, wherein classifying content stored in the document object mode tree into content blocks includes:
   traversing the document object model tree; and
   comparing the location of content stored in the nodes of the tree with the area occupied by each content block.

18. The method of claim 10, wherein storing the content blocks into a multi-celled table includes:
   generating a binary tree data structure with content blocks stored in the leaf nodes of the binary tree;
   determining if each content block is oriented horizontally or vertically;
   if a content block is oriented horizontally, creating the multi-celled table with a left cell and a right cell; and
   conversely, if a content block is oriented vertically, creating the multi-celled table with a top and bottom cell.

19. A computing device including a display and a central processing unit for displaying only relevant content of a Web page, comprising:
   an operating system operative to identify events and communicate event data to a graphical user interface, wherein the graphical user interface differentiates between commands based on a direction a pointer moves at a time the pointer is activated;
   a Web browser capable of requesting at least one Web page from remote computers and displaying the Web page on the display;
   a graphical user interface that receives data from the operating system and identifies user-generated commands represented by the event data; and
   a content display module stored in the Web browser operative to initially display the Web page in an overview mode at a predetermined magnification;
   dividing the Web page into a plurality of cells, wherein each cell comprising either the relevant content or non-relevant content by:
      creating a document object mode tree representation of the Web page;
      determining the area occupied by each content block on the Web page by identifying coordinate positions occupied by each content block;
      classifying content stored in nodes of the document object model tree into their associated content blocks by comparing position and dimension information of content stored in the nodes to the position and dimension of the content blocks;
      storing the content blocks into a multi-celled table; and
      inserting the multi-celled table in a modified Web page such that the modified web page comprises the multi-celled table in addition to the relevant and non-relevant content of the Web page; and
   in response to receiving a user-generated command to identify the relevant content of the Web-page, displaying only the relevant content of the Web page by:
      identifying cells from the Web page comprising relevant content that will be displayed;
      identifying cells from the Web page comprising non-relevant content that will not be displayed; and
      displaying the identified cells comprising the relevant content, wherein the displayed cells are magnified by an amount equal to the space freed by the cells that will not be displayed.

* * * * *